United States Patent [19]

Hvidsten

[11] Patent Number: 4,736,072

[45] Date of Patent: Apr. 5, 1988

[54] CABLE SPLICE CLOSURES

[76] Inventor: Trygve E. Hvidsten, Arendal, Heldray Road, Noordhoek, Cape Town Cape Province, South Africa

[21] Appl. No.: 838,112

[22] Filed: Mar. 10, 1986

[30] Foreign Application Priority Data

Mar. 14, 1985 [ZA] South Africa ............... 85/1921

[51] Int. Cl.⁴ .................................................. H02G 15/08
[52] U.S. Cl. ........................................ 174/93; 174/91; 174/DIG. 8
[58] Field of Search ................. 174/91, 93, DIG. 8

[56] References Cited

U.S. PATENT DOCUMENTS

| 707,055 | 8/1902 | Earl | 174/91 |
| 2,621,228 | 12/1952 | Tompers | 174/93 |
| 3,044,037 | 7/1962 | Honig | 174/91 X |
| 3,124,405 | 3/1964 | Massa | 174/91 |
| 3,188,382 | 6/1965 | Fuss | 174/91 |
| 3,254,153 | 5/1966 | Kohler | 174/93 |
| 3,624,594 | 11/1971 | Trimble | 174/DIG. 8 X |
| 3,869,561 | 3/1975 | Wettre | 174/91 X |
| 4,234,218 | 11/1980 | Rogers | 174/DIG. 8 X |
| 4,347,402 | 8/1982 | Reyners | 174/91 |

FOREIGN PATENT DOCUMENTS

| 271626 | 2/1964 | Australia | 174/93 |
| 80016 | 6/1983 | European Pat. Off. | 174/93 |
| 18417 | 7/1966 | Japan | 174/93 |
| 242017 | 9/1946 | Switzerland | 174/93 |

Primary Examiner—Morris H. Nimmo
Attorney, Agent, or Firm—Ladas & Parry

[57] ABSTRACT

A closure for a cable splice is disclosed which comprises a main sleeve and two end structures. One end structure is secured to the sleeve by means of a locking ring screwed onto a cap of the end structure. The sleeve has an internal flange and the cap has an external flange which lies adjacent the flange of the sleeve. Engagement between the flanges prevents the end structure being withdrawn from the sleeve. The end structure is connected to the sleeve by means of a split clamping ring which is held in place by a tightening ring. Once the ring has been loosened and slid back, and the clamping ring and tightening ring removed, the sleeve can be slid back over the cable to provide access to the splice.

9 Claims, 4 Drawing Sheets

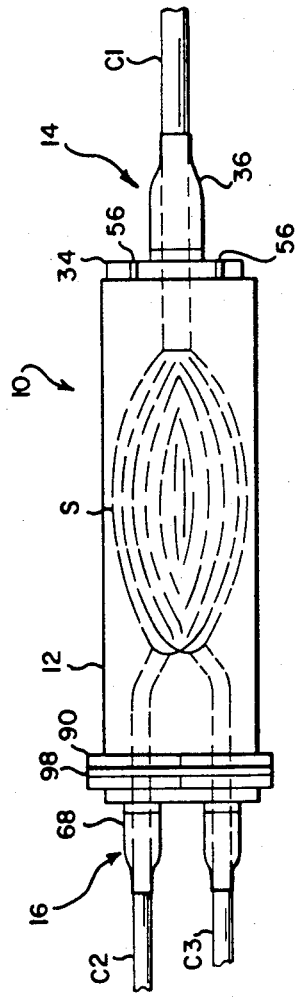
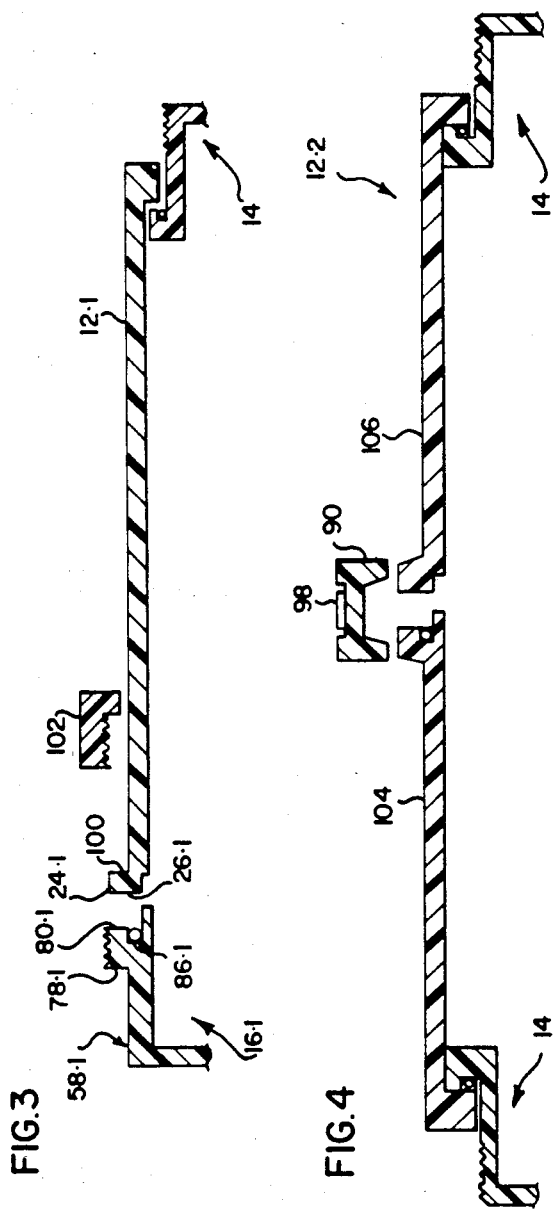
FIG.1
FIG.3
FIG.4

CABLE SPLICE CLOSURES

This invention relates to cable splice closures.

BACKGROUND OF THE INVENTION

When telephone cables were first developed, they were lead sheathed. Having made a splice between two cables, the splice was closed by means of a lead sleeve soldered to both cables. Re-access to the cable splice was obtained by breaking the soldered joints so that the lead sleeve could be slid back over one of the cables thereby revealing the splice. Re-closing was by sliding the sleeve back and re-soldering it to the cables.

With the advent of plastic sheathed cables, lead sheathed cables were phased out. However, the lead sleeving method of closing a cable splice was retained. To provide the necessary junction between the lead sleeve and the plastics sheathed cables, small tubular pieces of lead were attached to the cable ends. Tapes and epoxy resins have been used for this purpose. The lead sleeve was then simply soldered to the lead pieces.

The adaption of a first generation closure for use with second generation cable was obviously not entirely satisfactory. Failures occurred where the pieces of lead tubing were attached to the cables. Also, after a while, deterioration of the lead sleeve meant that it had to be replaced entirely. The only way this could be done was to split it lengthways, remove it and apply another sleeve which had previously been split lengthways. The new sleeve then had to have a totally air and watertight longitudinal seam formed in the wall thereof.

With the advent of synthetic plastics material which shrunk when heated, new possibilities were opened up. Various proposals were made, and indeed have been used commercially, all these methods relying on the ability of a sleeve of suitable synthetic plastic material to shrink onto a cable (or some other component of the closure) and form an air and watertight joint. The major drawback with prior proposals of this nature is that, to gain re-access to a previously closed splice, the sleeve must be destroyed. Normally this involves simply cutting the shrunk sleeve away and discarding it. Because the cable splice is permanent, it is not possible to slide a new sleeve on. After re-opening a splice the only way that it can be closed is to use a longitudinally split sleeve. Complex clamping and sealing arrangements are then required to close the longitudinal seam of the new sleeve.

In addition to the fact that destruction of major parts of the closure is necessary to gain access to the splice, subsequent re-closure requires a considerable degree of skill on the part of the workman. In one form a mastic is applied to the longitudinal seam and then clamps applied. After the closure has been re-opened, the previously used mastic must be cleaned away completely. If it is not cleaned away properly before the new mastic is applied, then the possibility exists that the longitudinal seam will not close properly.

OBJECTS OF THE INVENTION

The main object of the present invention is to provide a simple closure for a cable splice which can be re-opened without the necessity of destroying any parts of the closure.

BRIEF DESCRIPTION OF THE INVENTION

According to one aspect of the present invention there is provided a cable splice closure comprising;

an open ended sleeve;

a first end structure through which, in use, a cable passes from externally of the splice closure to internally thereof;

means for releasably connecting said first end structure to one end of said sleeve;

an inwardly protruding circumferentially extending flange at the other end of the sleeve;

a second end structure through which, in use, a cable passes from externally of the splice closure to internally thereof, the second end structure having an outwardly protruding peripherally extending flange the outside diameter of which is greater than the inside diameter of said flange of the sleeve, said flange of said second end structure being within said sleeve and engagement between said flanges preventing withdrawal of said second end structure from the sleeve through said other end of the sleeve.

The second end structure preferably comprises a cap including a cylindrical portion, part of said cylindrical portion lying inside said sleeve and part of said portion lying outside said sleeve, said flange of the second end structure encircling that part of said cylindrical portion which is inside said sleeve, the part of said cylindrical portion which lies outside the sleeve being externally threaded, and the splice closure further including a locking ring which, when screwed onto the cylindrical portion into abutting relationship with the end face of said sleeve, draws said flange of said second end structure against said flange of said sleeve.

To facilitate the provision of air and water tight seals around the cable, at least one of said end structures can comprise a cap having a transverse wall and a tube extending in both directions from said wall, said tube forming an opening through the end structure and opposite ends of the tube being within sheaths of heat shrinkable synthetic plastics material, the parts of the sheaths which have said tube therein being shrunk onto the tube and the remainders of said sheaths being in an unshrunk condition.

In another form at least one of said end structures comprises a cap which is injection moulded in heat shrinkable synthetic plastics material, said cap having a transverse wall and a thin walled sheath integral with said transverse wall and protruding on both sides of said wall, the thin walled sheath forming an opening through the end structure and end sections of said thin walled sheath having been mechanically expanded to a larger diameter than a centre section of the thin walled sheath.

According to a further aspect of the present invention there is provided an end structure for a cable splice closure, the end structure comprising a transverse wall and a tube, the tube protruding in both directions from the wall and forming an opening through which, in use, a cable is passed.

BRIEF DESCRIPTION OF THE DRAWINGS

For a better understanding of the present invention, and to show how the same may be carried into effect, reference will now be made, by way of example, to the accompanying drawings in which:

FIG. 1 is a side elevation of a cable joint closure in use;

FIG. 3 is a fragmentary section diagrammatically illustrating an alternative form of closure;

FIG. 4 is a fragmentary section diagrammatically illustrating yet another form of closure;

DETAILED DESCRIPTION OF THE DRAWINGS

Figure 2:
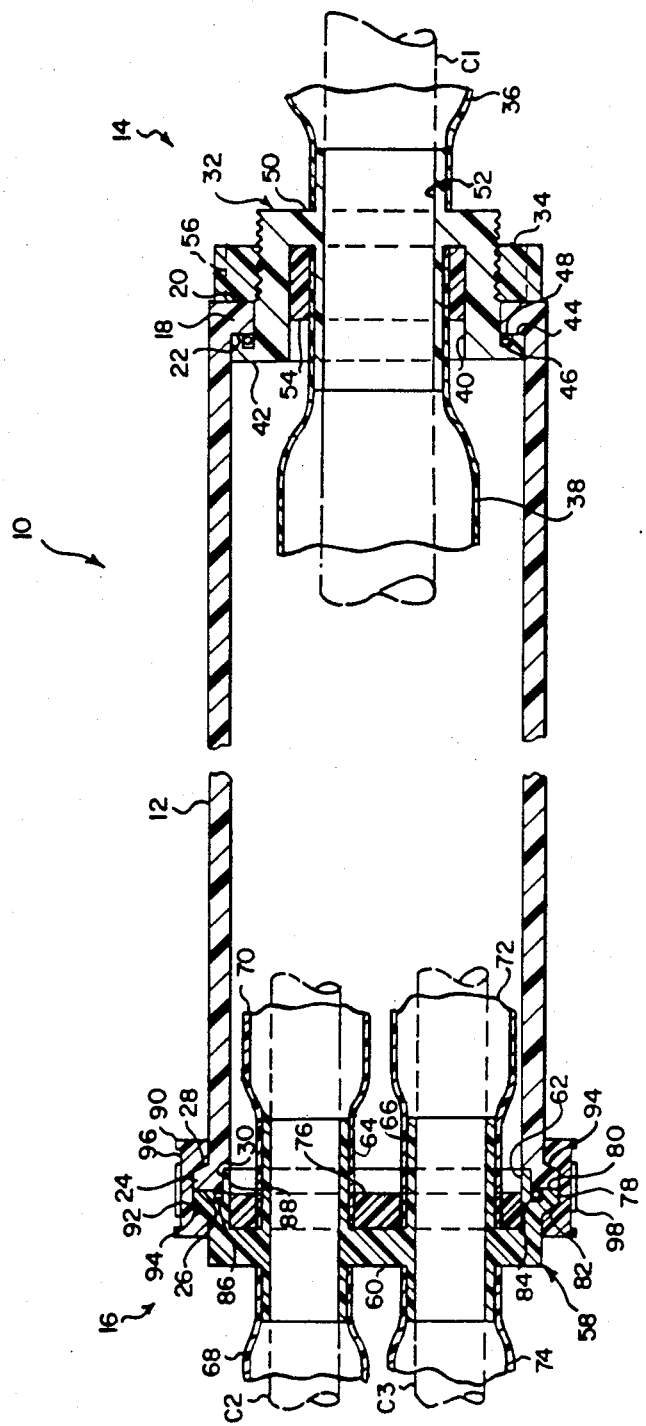
FIG. 2 is a vertical axial section, to a larger scale, through the closure of FIG. 1 prior to use.

Referring firstly to FIG. 1, the cable joint closure is generally designated 10 and comprises a main sleeve 12 and two end structures which are designated 14 and 16. In FIG. 1 a single cable C1 is shown entering from the right and two cables C2 and C3 are shown entering from the left. Within the closure 10 there is a splice or joint S which substantially fills the cross sectional area of the sleeve 12.

The main sleeve 12 (see FIG. 2) has, at one end thereof, a flange 18 which extends around the entire inner circumference of the sleeve and protrudes radially inwardly therefrom. One face of the flange 18 forms the end face 20 of the sleeve 12, the other face of the flange 18 (designated 22 in FIG. 2) forming a sealing face.

At the other end of the sleeve 12 there is a further flange 24, the flange 24 extending around the entire circumference of the outer face of the sleeve 12 and protruding radially outwardly therefrom. The face 26 of the flange 24 forms the other end face of the main sleeve 12 and also serves as a sealing face. The other face 28 of the flange 24 is frusto-conical in form. Internally the main sleeve 12 is provided with a short end section 30 of greater diameter. This provides a cylindrical recess for part of the end structure 16 as will be described in more detail hereinafter.

The end structure 14 comprises a cap 32, a locking ring 34, and two sheaths 36 and 38 of heat shrinkable synthetic plastics material.

The cap 32 comprises a cylindrical portion 40 which has a flange 42 at one end thereof. The flange 42 is an external flange and protrudes outwardly from the cylindrical portion 40. One face of the flange 42 (designated 44 in FIG. 2) is formed with a circumferentially extending groove 46 in which there is a sealing ring 48. The sealing ring 48 is shown as an O-ring but can be of any suitable type.

The cap 32 further includes a transverse wall 50 which is integral with the cylindrical portion 40. Moulded integrally with the wall 50, and co-axial with the cylindrical portion 40, is a tube 52 which protrudes both outwardly from the wall 50 and inwardly from the wall 50 to beyond the flange 42.

The sheaths 36 and 38 are heat shrunk onto the tube 52. As will clearly be seen from FIG. 2 only that part of the sheath 36 which has the tube 52 entered in it is heat shrunk. The remaining part of the sheath 36, because it still has to be shrunk bells-out from the end of the tube 52. Likewise, only that part of the sheath 38 which has been slipped over that portion of the tube 52 which is, in FIG. 2, to the left of the wall 50 has been heat shrunk.

To provide added security against ingress of moisture into the closure and egress of air from the closure, and also to improve mechanical strenght, the cap 32 is placed with the flange 42 uppermost and a mass of synthetic resin designated 54 is poured into the cylindrical space which exists between the inner cylindrical face of the portion 40 and the outer cylindrical face of that part of the sheath 38 which has been shrunk onto the tube 52. The wall 50 forms the base of this recess. Part of the length of the sheath 38 is, as will clearly be seen from FIG. 2, embedded in this mass of resin. If the portion 40 is extended to the right of the wall 50, then a further resin mass can be provided on the other side of the wall 50.

Part of the exterior of the cylindrical portion 40 is threaded and the locking ring 34 screws onto this portion. The locking ring 34 has a series of notches 56 (see also FIG. 1) in the outer face thereof to facilitate the application of a tool for tightening and loosening purposes. It will be understood that the ring 34 could be in the form of a hexagonal nut with a series of flat external faces.

Turning now to the end structure 16, this comprises a cap 58 having a transverse end wall 60 and a short cylindrical portion 62. Moulded integrally with the end wall 60 are two tubes 64 and 66 the function of which is the same as the function of the tube 52. The sheaths which are heat shrunk onto the tube 64 are designated 68 and 70 and the sheaths which are heat shrunk onto the tube 66 are designated 72 and 74. A mass of resin is shown at 76, this having been poured, while the cap was positioned with the end wall 60 forming the base thereof, into the space which is bounded externally by the inner cylindrical face of the cylindrical portion 62 and internally by the two tubes 64 and 66. Inner end parts of the sheaths 70 and 72 are embedded in the mass of resin 76.

Externally of the short cylindrical portion 62 there is a flange 78. The flange 78 is similar in configuration to the flange 24 and includes a face 80 which lies in a radial plane and a further face 82 which is generally frustoconical. The face 80 has a groove 84 therein in which there is a sealing ring 86.

Inwardly of the groove 84 the cylindrical portion 62 is extended by means of a spigot 88 which fits into the section 30 thereby centering the cap 58 with respect to the sleeve 12.

A split clamping ring is shown at 90, the ring 90 consisting of two semi-circular parts. In section the ring 90 has an internal groove 92, the side faces 94 of which are inclined at substantially the same angles as the faces 28 and 82. There is also a shallow groove 96 in the outer face of the ring 90.

The final component illustrated in FIG. 1 is a tightening ring 98 which can be of any suitable type. A ring of the 'Jubilee' type is suitable. The function of the tightening ring 98 is to urge the two semi-circular parts of the ring 90 towards one another so that they in turn urge the faces 26 and 80 towards one another thereby compressing the sealing ring 86.

Applicant has found that the material manufactured by the Hoechst Group of Companies under their trade name "Hostalen" can be used to produce the sleeve 12, the caps 32 and 58, the locking ring 34 and the clamping ring 90. The resin masses 54 and 76 can be of the curable material manufactured by 3M Company under the trade name "Scotchcast Brand 4407" which is specifically produced for encapsulating splice closures.

The cable joint closure described above is used in the following manner. The locking ring 34 and then the main sleeve 12 are passed over the cable C1 and slid back so that the cable protrudes through that end of the sleeve 12 at which the flange 24 is provided.

The cable C1 is then passed through the sheath 36, the tube 52 and the sheath 38 leaving enough protruding from the sheath 38 to form the splice.

Having roughened the outside of the plastics coating of the cable C1, the sheaths 36, 38 are then heat shrunk so that they grip tightly around the cable C1. The sheath 36 is shown in its shrunk condition in FIG. 1.

The cables C2, C3 are then passed through their respective sheaths and tubes 68, 64, 70 and 74, 66, 72, sufficient cable being passed through to enable the splice to be made. The sheaths 68, 70, 72 and 74 are then heated and shrunk onto the cables C2 and C3. The sheaths 68 and 74 are shown shrunk in FIG. 1.

Splicing between the individual wires of the cables C1, C2 and C3 then takes place. When all the necessary connections have been made, the sleeve 12 is slid back over the end cap 32 until the face 26 of the flange 24 engages the face 80 of the flange 78 and the face 22 engages the face 44. The locking ring 34 is then screwed onto the threaded part of the cylindrical portion 40 of the cap 32 and tightened against the face 20. The ring 48 is compressed to provide an air and watertight seal.

The two halves of the clamping ring 90 are then pressed onto the abutting flanges 24 and 78 so that the inclined faces 94 of the ring 90 press the faces 26 and 80 together compressing the sealing ring 86.

Finally, the tightening ring 98 is placed around the clamping ring 90 and tightened so as to ensure that the sealing ring 86 is sufficiently compressed to provide the desired air and water tight seal between the end cap 58 and the main sleeve 12.

It will be understood that to gain access to the cable splice it is merely necessary to loosen the ring 98 and slip it back over the cable C2 and C3. Alternatively, the clamping ring can be undone completely and removed. The two halves of the clamping ring 90 are then removed and the locking ring 34 unscrewed from the end cap 32. The locking ring 34 is then slid back over the cable C1 followed by the main sleeve 12 which is no longer secured to either of the end structures. Access can now be had to the cable splice S.

Re-closure involves returning the sleeve 12, locking ring 34, clamping ring 90 and tightening ring 98 to the condition shown in FIG. 2. The end structures 14 and 16 remain permanently attached to the cables C1 on the one hand and C2, C3 on the other hand. The seals around the cables C1, C2 and C3 do not, therefore, have to be broken.

It is possible that, having opened the joint closure, the sealing rings 48 and 86 will have to be replaced. However, these are the only parts that might have to be replaced. No other part of the closure is destroyed in gaining re-access to the splice.

It is the practice to pressurize telephone cables to help in preventing moisture (whether in liquid or vapour form) entering the closures. For example, the entire cable may be pressurised at 0,7 Bar. It will be understood that this pressure acts on the end cap 32 and urges the face 44 against the face 22 thus compressing the sealing ring 48. Consequently, even if the locking ring 34 is not properly tightened, the internal pressure will apply sufficient compression to the sealing ring 48 to give adequate sealing.

In FIGS. 1 and 2 two cables are shown entering at one end of the closure and a single cable at the other end. It will be understood that this is merely by way of example and that there is no reason why there should not be a single cable entering from each end, or a plurality of cables entering from each end. It is merely necessary to provide the end caps 32 and 58 with the desired number of tubes 52, 64 and 66.

Figure 8:
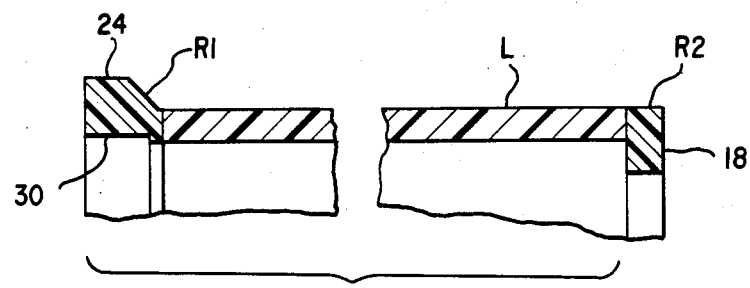
FIG. 8 illustrates part of one form of sleeve for a cable Joint.

To facilitate fabrication of the sleeve 12, a length of plastic pipe (see FIG. 8) can be used to form the major part of the sleeve. End rings R1 and R2 are welded to the ends of the length of pipe. One end ring is formed with the flange 24 and the section 30, and the other end ring incorporates the flange 18. Alternatively, the end rings can be moulded onto the length of pipe.

The structure described above may be modified in a number of ways. In FIG. 3 the sleeve is designated 12.1 and the left hand end structure is designated 16.1. The sleeve 12.1 is substantially the same as that illustrated in FIG. 2 except in that its flange 24.1 has a radial face 100. The end cap 58.1 of FIG. 3 has a flange 78.1 which is externally threaded. The clamping ring 90 and tightening ring 98 are replaced by an internally threaded locking ring 102 which is screwed onto the flange 78.1 and grips the flange 24.1 between itself and the flange 78.1.

To secure the sleeve 12.1 to the end cap 58.1, the faces 26.1 and 80.1 are abutted and the locking ring 102 screwed onto the threading of the flange 78.1. The flange 24.1 is gripped between the flange 78.1 and the ring 102 thereby compressing the sealing ring 86.1 sufficiently to provide the desired water and airtight seal.

The end structure 14 of FIG. 3 is the same as the end structure 14 of FIG. 2.

In FIG. 4 the sleeve 12.2 comprises two parts 104 and 106 and there are two end structures 14. The configuration of the right hand end of the sleeve part 104 is the same as that of the right hand end of the cap 58. The left hand end of the sleeve part 106 is the same as that of the left hand end of the sleeve 12. The sleeve parts 104 and 106 are connected together by a clamping ring 90 and tightening ring 98 of the type used in FIG. 2 to connect the end structure 16 to the sleeve 12.

Figure 5:
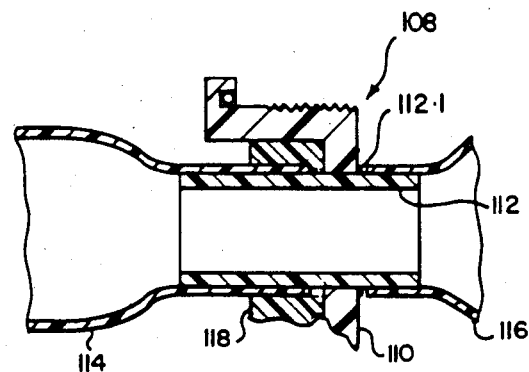
FIGS. 5, 6 and 7 illustrate modified forms of end structure.

Various modifications can also be made to the end structures 14 and 16. One such modification is shown in FIG. 5. In this form the end cap 108 initially has an unapertured disc-like end wall 110 when it is moulded. To fit a tube (equivalent to the tube 52) a hole is drilled in the end wall 110 and the tube (which is shown at 112) pushed through the hole. Ultra-sonic welding or other means can then be used to attach the tube 112 to the wall 110. Heat shrinkable sheaths 114 and 116 are then attached to opposite ends of the tube 112 and the mass of resin 118 formed. The tube preferably has an external bead such as is shown at 112.1 which bears on the wall 110 to locate the tube.

Figure 6:
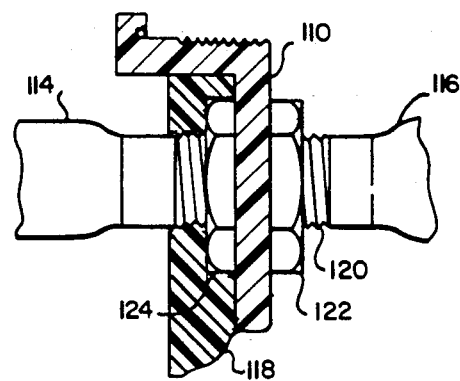

In the form of FIG. 6, the tube 120 is externally threaded and is secured to the drilled wall 110 by means of two nuts 122 and 124. In this form the mass of resin 118 applied embeds not only part of the sheath but also the nut 124.

If desired the one-piece end cap 32 can be injection moulded in heat shrinkable material. The integrally moulded sheath 52.1 (FIG. 7) has a thin wall. The length of the thin walled sheath 52.1 is equivalent to the combined lengths of the sheaths 36 and 38 and the tube 52 of FIG. 1. The sheaths 36, 38 are not required in this embodiment. Both end sections of the thin walled sheath 52.1 are mechanically expanded to a larger diameter after moulding as shown at 52.2. The cable, when pushed through the thin walled sheath, is a relatively tight fit in the center section but a loose fit in the opened-out end sections.

Once the cable C1 has been pushed through the thin walled sheath, the end sections of the thin walled sheath are heated so that, in the same manner as the sheaths 36, 38 were shrunk onto the cable, the end sections of the thin walled sheath are shrunk onto the cable.

Figure 7:
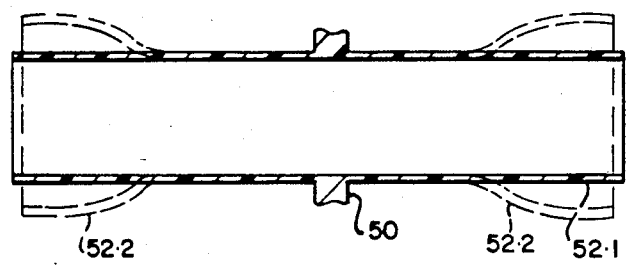

It will be understood that the modifications of FIGS. 5 to 7 are applicable not only to the end structure 14 but also to the end structure 16.

While the cables C1, C2 and C3 are shown and described as multi-cored pressurized telephone cables, it is possible to use the splice closure described with non-pressurized cable, fibre optic cable, co-axial cable (for data transmission) and electrical power transmission cable. It can also be used with cable which is petroleum jelly filled.

The splice closure described can only be used in circumstances where a new splice S is being made. To apply the described structure to an existing splice, the sleeve 12 and both end structures 14, 16 have to be provided in longitudinally split form. Once applied to the cables, the sleeve 12 and end structures can be welded using heat or ultrasonic means so that the closure takes on the illustrated configuration.

I claim:

1. A cable splice closure, comprising:
   an open-ended sleeve;
   a first end structure at one end of said sleeve, through which, in use, a cable passes from externally of the splice closure to internally thereof;
   removable fastening means encircling said first end structure and said one end of said sleeve for releasably connecting said first end structure to said one end of said sleeve, said first end structure and said sleeve being separable by only translational movement in the direction of the axis of said sleeve after said fastening means has been removed;
   an inwardly-protruding, circumferentially-extending flange on the other end of said sleeve;
   a second end structure at said other end of said sleeve, through which, in use, a cable passes from externally of the splice closure to internally thereof, said second end structure having an outwardly-protruding, peripherally-extending flange inside said sleeve, the outside diameter of said flange of said second end structure being greater than the inside diameter of said flange of said sleeve for preventing withdrawal of said second end structure from said sleeve through said other end of said sleeve with engagement between said flanges and sliding of said one end of said sleeve toward said second end structure, whereby to slide said sleeve off a splice between the cables therein.

2. A cable splice closure according to claim 1, wherein said second end structure comprises a cap including a cylindrical portion, part of said cylindrical portion lying inside said sleeve and part of said portion lying outside said sleeve, said flange of the second end structure encircling that part of said cylindrical portion which is inside said sleeve, the part of said cylindrical portion which lies outside the sleeve being externally threaded, and the splice closure further including a locking ring which, when screwed onto the cylindrical portion into abutting relationship with said sleeve, draws said flange of said second end structure against said flange of said sleeve.

3. A cable splice closure according to claim 1, wherein at least one of said end structures comprises a cap having a transverse wall and a tube extending in both directions from said wall, said tube forming an opening through the end structure and opposite ends of the tube being within sheaths of heat shrinkable synthetic plastics material, the parts of the sheaths which have said tube therein being shrunk onto the tube and the remainders of said sheaths being in an unshrunk condition.

4. A cable splice closure according to claim 3, in which said cap comprises a cylindrical portion, the space on at least one side of said transverse wall which is bounded by said tube, said cylindrical portion and said transverse wall being filled with a mass of synthetic resin, part of the sheath which lies on that side of said transverse wall being embedded in said mass.

5. A cable splice closure according to claim 1, wherein at least one of said end structures comprises a cap which is injection moulded in heat shrinkable synthetic plastics material, said cap having a transverse wall and a thin walled sheath integral with said transverse wall and protruding on both sides of said wall, the thin walled sheath forming an opening through the end structure and end sections of said thin walled sheath having been mechanically expanded to a larger diameter than a centre section of the thin walled sheath.

6. A cable splice closure according to claim 1, wherein said one end of the sleeve comprises an outwardly protruding circumferentially extending flange having a radial face and a frusto-conical face, and said first end structure includes a cap having a flange which itself has a radial face and a frusto-conical face, said radial faces abutting and there being a clamping ring consisting of at least two part-circular sections, said sections being grooved on their inner faces and the side faces of the groove matching the frusto-conical faces of said sleeve and said cap of the first end structure, and a tightening ring encircling said clamping ring for urging the clamping ring sections radially inwardly.

7. A cable splice closure according to claim 6, in which said sleeve comprises a length of cylindrical pipe and a ring attached to each end of the pipe, said inwardly protruding flange of the sleeve forming part of one ring and said outwardly protruding flange of the sleeve forming part of the other ring.

8. A cable splice closure comprising an open ended sleeve consisting of first and second co-axial end-to-end parts, each sleeve part having an inwardly protruding circumferentially extending flange at one end thereof, and the other ends of the sleeve parts abutting one another, a first end structure through which, in use, a cable passes from externally of the splice closure to internally thereof, said first end structure being at said one end of said first sleeve part and having an outwardly protruding peripherally extending flange the outside diameter of which is greater than the inside diameter of said flange of said first sleeve part, said flange of said first end structure being within said first sleeve part and engagement between the flanges of the first end structure and first sleeve part preventing withdrawal of said first end structure from said first sleeve part through said one end of the first sleeve part, a second end structure through which, in use a cable passes from externally of the splice closure to internally thereof, said second end structure being at said one end of said second sleeve part and having an outwardly protruding peripherally extending flange the outside diameter of which is greater than the inside diameter of said flange of said second sleeve part, said flange of said second end structure being within said second sleeve part and engagement between the flanges of the second end structure and second sleeve part preventing withdrawal of said second end structure from said second sleeve part through said one end of the second sleeve part, and removable fastening means encircling said other ends of the sleeve parts for releasably connecting said other ends of the sleeve parts to one another.

9. A cable splice closure according to claim 1, in which the removable fastening means comprises an axially split clamping ring including at least two part circular sections and means for urging said sections radially inwardly.

* * * * *